United States Patent [19]

Uhlemayr et al.

[11] 3,860,670

[45] Jan. 14, 1975

[54] PRINTING INK BINDER

[75] Inventors: Albert Uhlemayr, Forstinning; Heinz Traitteur, Munich, both of Germany

[73] Assignee: Michael Huber Munchen, Heimstetten, Germany

[22] Filed: July 6, 1972

[21] Appl. No.: 269,296

[30] Foreign Application Priority Data
July 8, 1971  Germany............................ 2134103
Feb. 17, 1972  Germany............................ 2207481

[52] U.S. Cl.................. 260/829, 260/844, 260/848
[51] Int. Cl. ............................................ C08f 29/10
[58] Field of Search...................... 260/848, 845, 829

[56] References Cited
UNITED STATES PATENTS

| | | | |
|---|---|---|---|
| 2,163,637 | 6/1939 | Thomas ............................. | 260/848 |
| 2,422,002 | 6/1947 | Elwell et al. ........................ | 260/848 |
| 2,521,359 | 9/1950 | Garber................................ | 260/848 |
| 3,083,174 | 3/1963 | Fefer et al. ......................... | 260/848 |

*Primary Examiner*—John C. Bieutge
*Attorney, Agent, or Firm*—Karl W. Flocks

[57] ABSTRACT

A binder for printing inks, possessing good compatibility with conventional printing ink components, is provided by reacting an unsaturated hydrocarbon resin with an alkylphenol of 4 to 12 alkyl carbon atoms or with an arylalkylphenol and/or bisphenol and with formaldehyde in the presence of oxalic acid, citric acid, tartaric acid or trifluoro-acetic acid complex.

7 Claims, No Drawings

PRINTING INK BINDER

This invention relates to a process for the production of film-forming condensation products which are suitable for use as binders in printing inks, and to the products so produced.

Resin compositions based on colophony, i.e., rosin, find numerous uses for surface coatings and as adhesives, resin lacquers and expecially as binders in the manufacture of printing inks. The resin compositions which are obtained by a reaction of colophony, phenols and formaldehyde in the presence of acid catalysts are in particular capable of diverse use because of their miscibility with other components when manufacturing printing ink compositions and because of their good solubility in customary solvents of aromatic or aliphatic hydrocarbons and their compatibility with drying oils. These modified colophony resins are also relatively rapidly drying, since they allow the solvents to evaporate rapidly. In addition they form, together with the oil component, surface coatings which become insoluble and are glossy and abrasion-resistant. The condensation products which are obtained from colophony, p-cymylphenol, and formaldehyde in the presence of salts of zinc, calcium, magnesium or manganese of an inorganic or organic acid according to West German Offenlegungsschrift No. 1,965,403 are alleged to be particularly suitable for use as printing ink binders. In a preferred embodmient, polyols, such as glycerin or pentaerythritol are additionally co-condensed. The esterification of the colophony, thus achieved, causes a pronounced increase in the size of the molecule, as a result of which, however, the product becomes somewhat more brittle.

Colophony is however, a relatively expensive starting material, which, being a natural product, is not available in unlimited amount. Attempts have therefore already been made for a considerable time to replace these colophony resins by resin compositions based on other components. According to West German Auslegeschrift No. 1,259,098 carboxylated drying oils obtained by the reaction of unsaturated dicarboxylic acids with drying oils are first reacted with phenol and then with a mixture of formaldehyde and aqueous ammonia solution to give condensation resins. Petroleum or hydrocarbon resins, which are essentially obtained by polymerisation of indene or similar unsaturated hydrocarbons, have also been converted, by modification into resin compositions which have similar properties to those possessed by the colophony resins. West German Pat. No. 1,225,478 discloses an emulsifiable petroleum resin which is obtained by the reaction of tall oil and a reaction product of petroleum resin with an $\alpha, \beta$-unsaturated carboxylic acid at about 200°C. U.S. Pat. No. 3,468,829 and German Pat. No. 1,546,771 additionally have disclosed binders for gravure printing inks which are produced by the reaction of a petroleum resin, in the fused state, with an $\alpha, \beta$-unsaturated dicarboxylic acid, and reaction of the resulting adduct with a reactive compound of a metal of group 2 of the Mendeleev periodic system.

However, it has been found that the modified hydrocarbon resins hitherto disclosed are nevertheless not capable of diverse use as the colophony resins, since they are less compatible with other customary components. In particular, when manufacturing printing ink compositions, good compatibility with other components which may be used for the purpose, such as drying oils, solvents and pigments, is an essential requirement. Furthermore, the condensation products must possess good reactivity with the drying oils.

In accordance with the present invention there is provided a process for the production of a film-forming condensation product, which possesses very good compatibility and is suitable as binder for printing inks, which process comprises reacting, while heating, a hydrocarbon resin containinig at least one unsaturated bond with an alkylphenol and/or bisphenol and with formaldehyde or paraformaldehyde, in the presence of oxalic acid, citric acid, tartaric acid or boron-trifluoroacetic acid complex as a catalyst.

If desired, the batch of hydrocarbon resin, alkylphenol, formaldehyde and catalyst may be modified by also adding styrene. The product thus obtained is similar to a reaction product which is obtained using an arylalkylphenol.

The reaction essentially takes place in a stoichiometric ratio relative to the phenol, formaldehyde and unsaturated bond in the hydrocarbon resin. Suitable hydrocarbon resins which may be used are, among others, the known indene resins or indene-coumarone resins and indene-cyclopentadiene resins, which generally possess iodine numbers of between 30 and 200 and melting points of between 60° and 180°C.

The unsaturated hydrocarbon resins obtained by copolymerisation from vinyl toluene, dicylopentadiene, indene and styrene are also suitable for the process according to the invention.

The hydrocarbon resins which are obtained by polymerisation of unsaturated hydrocarbons contained in the $C_8$ to $C_{10}$ fractions of the distillation runs of a petroleum cracker, are also particularly suitable. This fraction contains, among others, styrene, vinyltoluene, indene and dicyclopentadiene. The higher the proportion of the dicyclopentadiene, the more double bonds there are contained in the copolymer. Accordingly, a resin which is obtained basically by polymerisation of dicyclopentadiene therefore contains a particularly high proportion of double bonds.

Suitable alkylphenols are especially butylphenol, as well as nonylphenol or alkylphenol mixtures which contain these compounds, it being of advantage if the alkyl chain is branched. Among the arylalkylphenol compounds, cumylphenol is particularly suitable. The preferred bisphenol is above all diphenylolpropane. The formaldehyde may be employed in the form of paraformaldehyde or of trioxane.

Among the organic acids used as acid condensation catalysts, oxalic acid has proved particularly suitable. Oxalic acid splits in the course of the condensation reaction, presumably because of a redox process, into carbonic acid or carbon dioxide which then escapes from the reaction mixture together with the water of reaction. The acids mentioned, namely oxalic acid, citric acid, tartaric acid or boron-trifluoro-acetic acid complex cannot be replaced by other organic acids. Comparison experiments show that the products obtained with formic or acetic acid do not possess the desired properties.

The resin obtained according to the invention is light in color and clear and shows a neutral reaction, in contrast to the known condensation resins obtained using unsaturated acids, expecially maleic acid, which are carboxylated resins of acid character. The neutral reaction of the condensation resins according to the invention is of great advantage for many purposes.

The reaction as a rule already starts at temperatures only slightly above the melting point of the hydrocarbon resin used, and is continued by slowly raising the temperature until the theoretical amount of water has been produced and been removed from the reaction mixture, if necessary after addition of an inert solvent, with which the water distils azeotropically.

By choosing the individual reactants, especially as regards the length of the alkyl group in the phenol component, it proves possible to manufacture condensation products the compatibility of which, with other components for the coating compositions and especially in the case of the binders for printing ink compositions, may be varied over a broad range.

The property of the new condensation resins according to the invention — that they show good compatibility with aluminium soaps — is of particular advantage. The resins have a relatively high melting point but are nevertheless elastic, even without the addition of plasticiser, so that they possess very good abrasion resistance. The ability to release solvents rapidly and completely is of particular advantage, so that, for example, lacquers or printing inks manufactured from them dry very rapidly. The good chemical resistance, especially to hydrolytic factors, is due to the absence of saponifiable bonds, such as are present, for example, in known condensation products which are obtained by co-condensation of polyols. The products have very good compatibility with basic pigments, since carboxyl groups are absent.

The process according to the invention is illustrated in more detain hereinafter with the aid of Examples, and the particular suitability for the menufacture of printing ink compositions is also shown for one of the condensation products obtained. It should, however, be mentioned that the condensation resins according to the invention need not be used merely for this purpose. Because of their good compatibility and especially because they give clear solutions in most solvents, the products also have other possible uses.

The comparison Examples using formic acid, acetic acid and sulphuric acid as the catalyst, of which the latter is otherwise particularly effective in the manufacture of condensation resins, show that in the process according to the invention the catalytic effect is evidently not based solely on the presence of the hydrogen ions. Rather, it is probable that the organic acids used according to the invention, and the boron-trifluoro-acetic acid complex, possess a specific effect of their own.

EXAMPLE 1

140 g of a polyindene resin having an iodine number of 90 and a melting point of 78°C were fused, together with 1 mol of formaldehyde (30 g), 1 mol of p-tert.-butylphenol and 2 g of oxalic acid, while stirring, in a 1 liter three-neck flask. On reaching 115°C., a vigorous reaction occured, with elimination of water. The temperature was raised to 160° – 165°C over the course of 30 minutes and towards the end of the reaction a vacuum was applied with a water pump in order to obtain the water of reaction quantitatively.

The molar batch yielded 18 ml of water, which corresponds to the theoretical amount. The resin obtained shows an average molecular weight of 700 (determined osmometrically) and a melting point of 86°C and is soluble in toluene, white spirit and linseed oil.

EXAMPLE 2

140 g of polyindene resin (iodine number 90, melting point 78°C) together with 1 mol of formaldehyde (30 g), 0.5 mol of p-tert.-butylphenol (75.1 g) and 0.25 mol of bisphenol A (57.1 g) and 1.8 g of oxalic acid were fused, with stirring, in a 1 liter three-neck flask. On reaching 115°C, a vigorous reaction occurred, with elimination of water. The temperature was raised to 200°C over the course of 30 minutes, and towards the end of the reaction a slight water pump vacuum was applied in order to obtain the water of reaction quantitatively. 18 ml of water were obtained from the molar batch, corresponding to the calculated amount.

A clear resin, which easily soluble in toluene and drying oils but only sparingly soluble in aliphatic solvents, and having a melting point of 111°C, was obtained. A 50 percent strength solution in toluene had a viscosity of 92 cp/20°C.

EXAMPLE 3

140 g of polyindene resin (melting point 78°C, iodine number 90) together with 1 mol of nonylphenol (isomer mixture), 1 mol of formaldehyde and 2 g of oxalic acid were fused in a 1 liter three-neck flask, while stirring. After reaching 118°C, a vigorous reaction occurred, with elimination of water. The temperature was raised to 160°C over the course of 30 minutes. Thwards the end of the reaction, a slight water pump vacuum was applied. 18 ml of water were obtained from the molar batch, corresponding to the theoretical amount.

A clear, plastic and sticky product, soluble in aliphatic and aromatic solvents and in vegetable oils, was obtained.

A 50 percent strength solution in toluene had a viscosity of 8.6 cp/20°C.

EXAMPLE 4

140 g of polyindene resin (melting point 78°C, iodine number 90) together with 1 g of formaldehyde (30 g), 0.5 mol of nonylphenol (isomer mixture) and 0.25 mol of bisphenol A and 2 g of oxalic acid were fused in a 1 liter three-neck flask, with stirring.

After reaching 118°C, a vigorous reaction occurred, with elimination of water. The water was distilled off and measured. The temperature was raised to 180°C over the course of 30 minutes and towards the end of the reaction a slight water pump vacuum was applied in order to obtain the water of reaction quantitatively. 18 ml of water were obtained from the molar batch, corresponding to the theoretical amount.

The resin obtained was a clear product of melting point 93°C which was soluble in aromatic and aliphatic solvents and in drying oils. Viscosity of the 50 percent strength toluene solution, 57 cp/20°C.

EXAMPLE 5

290 g of polyindene-coumarone resin of iodine number 42 and melting point 136°C, of which the 50 percent strength solution in toluene has a viscosity of 43 cp/20°C, together with 1 mol of formaldehyde (30 g), 0.5 mol of p-tert. butylphenol, 0.25 mol of bisphenol A, 1.8 g of oxalic acid and 64 g of toluene were fused in a 1 liter three-neck flask.

At 110°C, a vigorous reaction occurred, with elimination of water. The water was distilled off azeotropically and measured. The temperature was raised to 200°C over the course of the next 30 minutes, and towards the end of the reaction a slight water pump vacuum was applied in order to expel the water of reaction on the one hand, and the residual toluene on the other.

The resin obtained was a clear product of melting point 128°C which was soluble in aromatic colvents and drying oils (linseed oil) but sparingly soluble in aliphatic solvents. The viscosity of the 50 percent strength solution in toluene was 72 cp/20°C.

EXAMPLE 6

160 g of polyindene resin B1-85 (melting point 78°C, iodine number 90) together with 50 g of paraformaldehyde, 75.9 g of p-tert. butylphenol and 57.1 g of bisphenol A were fused in the presence of 5 g of oxalic acid in a 1 liter three-neck flask, while stirring.

After reaching 120°C, a vigorous reaction occurred, with elimination of water. The water was distilled off and measured. The temperature was raised to 225°C over the course of a further 30 minutes and towards the end of the reaction a slight water pump vacuum was applied in order to remove the water of reaction and the excess paraformaldehyde. 25 ml of water and approximately 10 ml of paraformaldehyde were obtained.

The resin obtained was a clear product of melting point 129°C, which was soluble in aromatic solvents but only sparingly soluble in aliphatic solvents and drying oils. Viscosity of the 50 percent strength solution in toluene: 640 cp/20°C.

To manufacture a printing ink, 47 g of the resin thus obtained were dissolved in 53 g of toluene, whereby a varnish of 300 cp/20°C resulted. 85 g of this varnish were then ground in a laboratory ball mill together with 10 g of phthalocyanine blue and 5 g of aluminium silicate. The gravure printing ink manufactured according to this formulation, on printing on coated printing fabric, shows extremely rapid solvent release, coupled with good gloss rentention.

To manufacture an offset printing ink, 43 g of the resin obtained were dissolved in 42 g of linseed oil at 180°C and the solution was subsequently diluted with 16 g of an aliphatic mineral oil (boiling range 240° to 270°C). 86 g of this binder were then ground with 12 g of -phthalocyanine blue, 1 g of polyethylene wax and 1 g of drier (Co octoate, 8 percent strength in mineral oil) on a laboratory roll mill to give an offset ink. Testing this color paste showed that prints on coated printing fabric gave rapid, non-tacky film formation coupled with good gloss and excellent abrasion resistance.

EXAMPLE 7

192 g of polyindene resin (melting point 78°C, iodine number 90) together with 106 g of cumylphenol and 54.84 g of bisphenol A were fused in the presence of 6 g of oxalic acid in a 1 liter three-neck flask, while stirring.

On reaching 120°C, 132 g of formaldehyde solution (35 percent strength in water) were added dropwise over the course of 2 hours.

The reaction started vigorously at 120°C, and the water of reaction was distilled off at the same time. Over the course of these 2 hours, the temperature was raised to 220°C and towards the end of the reaction a vacuum was applied with a water pump in order to remove the water of reaction and excess formaldehyde. Approximately 118 ml of water were isolated, as was a little p-formaldehyde.

The resin obtained was a clear product, soluble in aromatic solvents and having a melting point 118°C, which possessed only limited solubility in aliphatic solvents and drying oils. Viscosity of the 50 percent strength solution in toluene: 154 cp/20°C.

EXAMPLE 8

192 g of coumarone-indene resin (melting point 78°C, iodine number 90) together with 113 g of p-tert. butylphenol, 54.84 g of bisphenol A were fused in the presence of 6 g of oxalic acid in a 1 liter three-neck flask, while stirring.

On reaching 120°C, 132 g of formaldehyde solution (35 percent strength in water) were added dropwise over the course of 2 hours, 52 g of styrene being added dropwise simultaneously. The reaction started vogorously, the water of reaction being distilled off. Over the course of these 2 hours, the temperature was raised to 220°C and at the end of the reaction a slight water pump vacuum was applied in order to remove the water of reaction as well as excess reactants. Approximately 118 ml of water and a little p-formaldehyde were isolated.

The resin obtained was a clear substance, unobjectionable in odor, and soluble in aromatic solvents as well as in linseed oil, but only slightly soluble in aliphatic oils.

Melting point: 112°C
Viscosity of a 50 percent strength solution in toluene: 72 cp/20°C
Viscosity of a 40 percent solution in linseed oil: 9,570 cp/20°C

EXAMPLE 9

In a three-neck 1 liter flask, 96 g of an aliphatic hydrocarbon resin (Escorez 1102 B) having an iodine number of about 90 and a melting point of 100°C, together with 56.50 g of p-tert. butylphenol, 27.40 g of bisphenol A and 28 g of p-formaldehyde, were fused in the presence of 3 g of oxalic acid, while stirring.

On reaching 120°C, a vigorous reaction associated with elimination of water set in; at the same time, 26 g of styrene were added dropwise. Within 2 hours, the temperature was raised to 220°C, in which connection a slight water pump vacuum was applied toward the end of the reaction in order to remove the water of the reaction and excessive p-formaldehyde. There were isolated 35 ml of water as well as about 2 g of p-formaldehyde.

As end product, there was obtained a clear resin, unobjectionable in odor, having a melting point of 84°C, an excellent solubility in aromatics and vegetable oils and a poor solubility in aliphatic solvents.

Viscosity of a 50 percent strength solution in toluene: 41 cp/20°C
Viscosity of a 40 percent strength solution in linseed oil: 1,800 cp/20°C

EXAMPLE 10

In a three-neck 1 liter flask, 120 g of polyindene resin having an iodine number of 90, as well as a melting point of 78°C, together with 70.50 g of p-tert. butylphenol, 34.25 g of bisphenol A, 33 g of p-formaldehyde as well as 3.75 g of citric acid, were fused while stirring.

At 120°C, reaction started, with elimination of water. The temperature was raised to 220°C over the course of a further 2 hours and towards the end of the reaction a vacuum was applied with a water pump in order to remove the water of reaction and excess p-formaldehyde. 38 ml of water and approximately 5 g of p-formaldehyde were isolated.

The resin obtained had a melting point of 107°C ans was soluble in aromatic solvents and in vegetable oils while the solubility in aliphatic solvents was limited.

Viscosity of a 50 percent strength solution in toluene: 47 cp/20°C

Viscosity of a 40 percent strength solution in linseed oil: 3,200 cp/20°C

EXAMPLE 11

Batch as for Example 10, but using 3.75 g of tartaric acid instead of the citric acid.

The reaction product had a melting point of 105°C and was soluble in aromatics and vegetable oils, while having limited solubility in aliphatic solvents.

Viscosity of a 50 percent strength solution in toluene: 36 cp/20°C.

Viscosity of a 40 percent strength solution in linseed oil: 2,300 cp/20°C.

EXAMPLE 12

Example 10 was repeated using 3.75 g of oxalic acid instead of citric acid. A product of melting point 117°C was obtained.

Viscosity of a 50 percent strength solution in toluene: 94 cp/20°C.

Viscosity of a 40 percent strength solution in linseed oil: 5,900 cp/20°C.

EXAMPLE 13

Batch as for Example 10, but 3.75 g of boron-trifluoro-acetic acid were instead of the citric acid.

The color of the reaction product was darker and the melting point was 108°C; the product showed good solubility in aromatic solvents and vegetable oils and limited solubility in aliphatic solvents.

Viscosity of a 50 percent strength solution in toluene: 49 cp/20°C.

Viscosity of a 40 percent strength solution in linseed oil: 3,350 cp/20°C.

On testing the binders in printing inks, they were found to be particularly suitable for the following uses:

a. For toluene gravure printing:

The resins manufactured in Examples 1 to 7 were dissolved in toluene (solids content 50 – 55 percent), giving varnishes of 300 cp/20°C. 85 g portions of these varnishes were ground with 10 g of phthalocyanine blue and 5 g of aluminum silicate in a laboratory ball mill. When printed on paper, these inks showed extermely rapid solvent release with good gloss rentention and low tendency to blocking.

b. Offset printing and letterpress printing:

For this application, 43 g portions of a linseed oil-soluble development product were dissolved in 42 g of linseed oil at 180°C and subsequently diluted with 16 g of an aliphatic mineral oil (boiling range 240° – 270°C). 86 g of this varnish were then ground in each case with 12 g of phthalocyanine blue, 1 g of polyethylene wax and 1 g of drier (Co octoate, 8 percent strength Co in mineral oil) on a laboratory roll mill to give an offset ink. The testing of these color pastes showed that prints on coated printing fabrics gave rapid non-tacky film formation with good gloss and excellent abrasion resistance.

EXAMPLE 14

960 g of a cyclopentadiene resin (Escorex ECR-4 of Esso Chemie GmbH) having a bromine number of 60 and a melting point of 92°C, together with 564.6g of p-tert. butylphenol, 274.2 g of bisphenol A and 30 g of oxalic acid were fused in a 4 liter three-neck flask, while stirring. On reaching 130°C, 760 g of a 35 percent strength aqueous formaldehyde solution were added dropwise over the course of 7 hours, while continuously raising the temperature to 260°C. The reaction started spontaneously, with the water of reaction distilling off.

Towards the end of the reaction, a vacuum was applied with a water pump in order quantitatively to remove the water of reaction, and to remove excess reactants. Approximately 650 ml of water and 35 g of p-formaldehyde were removed.

A clear resin was obtained, which was of unobjectionable odor and soluble in aromatic and vegetable oils but sparingly soluble in aliphatic oils.

Melting point: 154°C.

Viscosity: 50 percent strength solution in toluene 270 cp/20°C 40 percent strength solution in linseed oil 37,900 cp/20°C

EXAMPLE 15

960 g of indene-cormarone resin (melting point 78°C, iodine number 90) together with 564.6 g of p-tert. butylphenol, 274.2 g of bisphenol A and 30 g of oxalic acid were fused in a 4 liter three-neck flack, while stirring. On reaching 120°C, 860 g of 35 percent strength formaldehyde solution were added dropwise over the course of 7 hours, while slowly raising the temperature to 260°C. The reaction started spontaneously and water of solution and water of reaction were distilled off simultaneously. Towards the end of the reaction, a vacuum was additionally applied with a water pump in order quantitatively to remove water of reaction and excess reactants. 720 ml of water containing excess formaldehyde were isolated. A clear resin was obtained, which was of unobjectionable odor and soluble in aromatic and vegetable oils but sparingly soluble in aliphatic oils.

Melting point: 156°C.

Viscosity: 50 percent strength solution in toluene 288 cp/20°C.

Viscosity: 40 percent strength solution in linseed oil 21,800 cp/20°C.

COMPARISON EXAMPLES

A. 160 g of polyindene resin (melting point 78°C, iodine number 90) together with 50 g of paraformaldehyde, 75.9 g of p-tert. butylphenol, 57.1 g of bisphenol A and 4.8 g of glacial acetic acid were fused in a 1 liter three-neck flask, while stirring.

After reaching 118°C, reaction took place, with elimination of water. The water was distilled off and measured. The temperature was raised to 185°C over the course of 30 minutes. Towards the end of the reaction a slight water pump vacuum was applied in order to obtain the water of reaction and the excess of paraformaldehyde. Approximately 17 ml of water and 5 ml of paraformaldehyde were isolated.

The reaction product obtained was a cloudy, plastic resin of only partial solubility in toluene and linseed oil. The viscosity of the 50 percent strength solution in toluene was only 11 cp/20°C which shows that only a slight increase in molecular size occurred, in comparison to Example 6.

B. 160 g of polyindene resin (melting point 78°C, iodine number 90) together with 50 g of paraformaldehyde, 75.9 g p-tert. butylphenol, 57.1 g of bisphenol A and 1.8 g of formic acid (in the form of a 35 percent strength aqueous solution) were fused in a 1 liter three-neck flask, while stirring.

After reaching 124°C reaction occurred, with elimination of water. The water was distilled off and measured. The temperature was raised to 197°C over the course of a further 30 minutes. Towards the end of the reaction a vacuum was applied with a water pump. The formic acid was obtained quantitatively from the batch, together with 7 ml of water of which approximately 50 percent originated from the formic acid solution. The reaction product obtained was a cloudy plastic resin of only slight solubility in toluene and linseed oil.

C. The same components as in Comparison Example B, except that, instead of the 1.8 g of formic acid, 9.2 g of adipic acid were employed, were fused together. At 123°C, reaction occurred, with elimination of water which was distilled off. During the next 30 minutes the temperature was raised to 185°C. Towards the end of the reaction a slight water pump vacuum was applied in order to expel the water of reaction. Approximately 11 ml of water were obtained. The reaction product which resulted was a cloudy resin which was insoluble in toluene and linseed oil.

D. The same batch as in Comparison Examples B and C, except that 1.6 g of sulphuric acid was used, on heating gave an uncontrollable reaction, in the course of which the product became very dark and solidified in the flask at 150°C. The product thus obtained was insoluble in aromatic and aliphatic solvents and in drying oils.

What we claim is:

1. A process for the production of a film-forming condensation product for use as an ink binder, comprising reacting while heating
    1. a thermoplastic hydrocarbon resin containing at least one unsaturated bond and having a melting point of 60°–180°C. and an iodine number between 30 and 200, said hydrocarbon resin comprising the polymerization product of unsaturated hydrocarbons contained in the $C_8$ to $C_{10}$ fraction of the distillation run of a petroleum cracker
    2. an alkylphenol in which the alkyl group contains 4 to 12 carbon atoms in mixture with bisphenol; and
    3. formaldehyde or paraformaldehyde;

said reaction being carried out in the presence of oxalic acid as a catalyst, and wherein said phenol, said formaldehyde and the unsaturated bond in said hydrocarbon resin are present in an approximately stoichiometric ratio.

2. A process in accordance with claim 1 wherein said hydrocarbon resin is selected from the group consisting of an indene resin of indene-coumarone or indene-cyclopentadiene, and dicyclopentadiene resin.

3. A process according to claim 1, in which said hydrocarbon resin is an indene resin.

4. A process according to claim 1, in which said hydrocarbon resin is a dicyclopentadiene homopolymer or copolymer.

5. A process according to claim 1, in which, styrene is also added to the reaction mixture.

6. A film-forming condensation product produced by the process according to claim 1.

7. A printing ink composition comprising, as a binder, a film-forming condensation product according to claim 6.

* * * * *